(12) United States Patent
Kaneko et al.

(10) Patent No.: US 7,150,198 B2
(45) Date of Patent: Dec. 19, 2006

(54) PRESSURE SENSOR

(75) Inventors: Yoshikazu Kaneko, Tokyo (JP); Hiroshi Wakabayashi, Tokyo (JP); Takayuki Yokoyama, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 11/182,547

(22) Filed: Jul. 15, 2005

(65) Prior Publication Data

US 2006/0016265 A1   Jan. 26, 2006

(30) Foreign Application Priority Data

Jul. 23, 2004   (JP)   ............................. 2004-216549

(51) Int. Cl.
*G01L 7/00* (2006.01)

(52) U.S. Cl. ........................................ 73/756

(58) Field of Classification Search ................ 73/700, 73/715, 756

See application file for complete search history.

(56) References Cited

U.S. PATENT DOCUMENTS 6,550,337 B1* 4/2003 Wagner et al. ............. 73/715
6,938,490 B1* 9/2005 Wagner et al. ............. 73/708
7,000,455 B1* 2/2006 Stritzelberger ............. 73/40
2002/0029639 A1* 3/2002 Wagner et al. ............. 73/756
2006/0053878 A1* 3/2006 Ikeda et al. ............. 73/204.26

FOREIGN PATENT DOCUMENTS

JP    2001-242031    9/2001

\* cited by examiner

*Primary Examiner*—Edward Lefkowitz
*Assistant Examiner*—Andre Allen
(74) *Attorney, Agent, or Firm*—Rankin, Hill, Porter & Clark LLP (57) ABSTRACT

A pressure sensor (1) includes a diaphragm (21) with a bottom formed of a thin-wall portion (210) and a pressure introducing joint (10), in which an austenitic precipitation hardening Fe—Ni heat resisting steel having high mechanical strength is used for the diaphragm (21), while an austenitic stainless steel that is relatively inexpensive is used for the pressure introducing joint (10). The diaphragm (21) and the pressure introducing joint (10) are integrated by welding, and Ni content of a weld portion is appropriately adjusted. Thereby, the pressure sensor (1) achieves high accuracy and reliability, and usage amount of the expensive austenitic precipitation hardening Fe—Ni heat resisting steel can be minimized in manufacturing the pressure sensor (1). Also, since the austenitic stainless steel has an excellent corrosion resistance, the pressure sensor (1) can be used in measurement of a fluid with high corrosiveness.

7 Claims, 10 Drawing Sheets

PRESSURE SENSOR

BACKGROUND OF THE INVENTION

1. Field of the Invention

The present invention relates to a pressure sensor for converting a fluid pressure to an electric signal for measurement.

2. Description of Related Art

Conventionally, there has been used a pressure sensor for measuring pressure of a fluid such as gas and liquid, in which the fluid pressure is converted to an electric signal for measurement. For instance, there is known a pressure sensor disclosed in Reference: Japanese Patent Laid-Open Publication No. 2001-242031. The pressure sensor includes a port attachment portion having a diaphragm and a strain gauge sensor, the pressure sensor measuring pressure of a fluid circulating in a pipe. In the port attachment portion, the diaphragm formed in a bottomed cylindrical shape having a thin-wall portion on a bottom thereof and the pressure introducing joint having a substantially cylindrical shape are integrated. An opening end of the pressure introducing joint is jointed with an end of the pipe in which the fluid circulates, from which the fluid is introduced inside the diaphragm. The strain gauge is provided on an outer surface of the thin-wall portion of the diaphragm with an insulating layer interposed therebetween. When the fluid introduced inside the diaphragm acts on the thin-wall portion, the thin-wall portion is strained due to the pressure of the fluid. The strain gauge detects the strain as an electric signal, and the electric signal is amplified and converted to obtain a pressure value of the fluid.

In such arrangement, in order to detect the pressure value of the fluid with higher accuracy, a higher strain should preferably be generated, and thus the thin-wall portion of the diaphragm should preferable be formed to be thinner. However, since the diaphragm receives a strong pressure from the fluid, high tensile strength is required for a material to be used. With regard to this, a martensitic precipitation hardening stainless steel is used as a material of the diaphragm, and since the material has a tensile strength of 1300 MPa or higher, the pressure value can be obtained with high accuracy and high reliability, which is suitable as a material for the diaphragm of the pressure sensor.

However, although the mechanical strength of the martensitic precipitation hardening stainless steel is high, the corrosion resistance thereof is low, so that the use of the pressure sensor disclosed in the Reference is limited for fluid such as acid gas or chemical solution having high corrosiveness and hydrogen gas causing embrittlement.

In addition, since the martensitic precipitation hardening stainless steel is expensive as well as difficult to machine, size, machining man-hours and scrap amount of members made of such material should preferably be minimized. Thus, if the material is used only for the diaphragm having the thin-wall portion, usage amount of the material can be kept to minimum, and thus the members can be manufactured with relatively low cost. However, the port attachment portion of the pressure sensor disclosed in the Reference has an arrangement in which the diaphragm and the substantially cylindrical pressure introducing joint are integrated. Therefore, in the pressure sensor, since the material is also used for the pressure introducing joint, which is not necessary, an extra cost is required in manufacturing the pressure sensor.

SUMMARY OF THE INVENTION

An object of the present invention is to provide a pressure sensor securing high accuracy and reliability and excellent corrosion resistance as well as low manufacturing cost.

In order to achieve the object, in the present invention, a bottomed cylindrical member is formed using an austenitic precipitation hardening Fe—Ni heat resisting steel that has a mechanical strength equal to a martensitic precipitation hardening stainless steel and has excellent corrosion resistance, while a pressure introducing joint is formed using an austenitic stainless steel that is relatively inexpensive and has excellent corrosion resistance, and respective members are integrated by welding. A pressure sensor according to an aspect of the present invention for measuring pressure of a fluid to be measured, includes: a pressure detector having a bottomed cylindrical member with a bottom formed in a thin-wall portion and a strain gauge formed on the bottom for detecting a strain of the bottom; and a pressure introducing joint for introducing a fluid to be measured inside the bottomed cylindrical member, in which the bottomed cylindrical member is made of an austenitic precipitation hardening Fe—Ni heat resisting steel containing 24 to 27 wt % of Ni and 13.5 to 16 wt % of Cr; the pressure introducing joint is made of an austenitic stainless steel; an end of a cylindrical portion of the bottomed cylindrical member and an end of the pressure introducing joint are butt-welded to integrate the bottomed cylindrical portion and the pressure introducing joint via a weld portion; and Ni content of the weld portion is adjusted to be higher than an average of Ni content of the bottomed cylindrical member and Ni content of the pressure introducing joint.

In the present invention, since the austenitic precipitation hardening Fe—Ni heat resisting steel is used for the thin-wall portion in which the strain is generated, high accuracy and reliability can be achieved. Further, since the bottomed cylindrical member and the pressure introducing joint are independently provided, and the relatively inexpensive austenitic stainless steel is used for the pressure introducing joint, usage amount of the expensive austenitic precipitation hardening Fe—Ni heat resisting steel can be minimized, thereby providing the pressure sensor that is relatively inexpensive.

The austenitic precipitation hardening Fe—Ni heat resisting steel having excellent corrosion resistance is used for the bottomed cylindrical member, and the austenitic stainless steel also having excellent corrosion resistance is used for the pressure introducing joint, so that portions exposed to the fluid to be measured can be provided with high corrosion resistance. Thus, the pressure sensor capable of measuring an acid gas, a corrosive chemical solution and a hydrogen gas causing embrittlement that have been difficult to measure can be provided. Generally, the austenitic stainless steel and the austenitic precipitation hardening Fe—Ni heat resisting steel exhibit poor weldability, and thus a hot crack likely occurs. Therefore, it is known to be difficult to perform welding on these materials, however in the present invention, the weldability can be enhanced by adjusting Ni content of the weld portion to be higher than the average of Ni content of the bottomed cylindrical member and that of the pressure introducing joint in welding the bottomed cylindrical member and the pressure introducing joint.

According to the present invention with the arrangement described above, it is preferable that the end of the cylindrical portion of the bottomed cylindrical member and the end of the pressure introducing joint are butt-welded with a filler metal interposed at a portion to be welded to adjust Ni content of the weld portion to be in the range from 20 to 30 wt %.

By disposing the filler metal on the portion to be welded, the Ni content of the weld portion can be controlled. Especially, by adjusting the Ni content to be in the range from 20 to 30 wt %, the material structure of the weld portion can be kept to be austenite structure, and occurrence of the hot crack in the weld portion can be prevented. Incidentally, although slight hot crack is occurred in the weld portion when Ni content of the weld portion is over 30%, there is no practical disadvantage, and most preferable welding can be achieved when the Ni content of the weld portion is in the range from 20 to 30 wt %.

According to the present invention with the arrangement described above, it is preferable that the end of the cylindrical portion of the bottomed cylindrical member and the end of the pressure introducing joint are welded by an electron beam.

In the electron beam welding, since the heating is performed by irradiating a high density electron beam in vacuum, the welding can be completed in a short time and a composition of a welded metal can be easily controlled. Further, the electron beam has a high energy density, and a deep welding in which an aspect ratio of a weld width and a weld depth is two or higher, and consequently, a welding joint can be performed without thermally affecting each of the bottomed cylindrical member, the pressure introducing joint and the strain gauge.

According to the present invention with the arrangement described above, it is preferable that: the filler metal is a disc with a hole formed at the center thereof, outer and inner diameters thereof being substantially equal to those of the cylindrical portion of the bottomed cylindrical member; the end of the cylindrical portion of the bottomed cylindrical member and the end of the pressure introducing joint are welded with the disc-shaped filler metal interposed therebetween to integrate the bottomed cylindrical portion and the pressure introducing joint via the weld portion; and Ni content of the weld portion is adjusted by a thickness of the disc of the filler metal to be in the range from 20 to 30 wt %.

In the present invention, since Ni content of the weld portion can be adjusted by adjusting the thickness of the disc-shaped filler metal with the hole at the center thereof, the welding can be performed with a simple structure. Also, by adjusting Ni content of the weld portion to be in the range from 20 to 30 wt %, the weldability can be enhanced.

With the arrangement of the present invention, it is preferable that the inner diameter of the cylindrical portion of the bottomed cylindrical member is substantially equal to that of the end of the pressure introducing joint the filler metal is cylindrical with an intercommunicating hole formed at the center thereof, an outer diameter thereof being substantially equal to the inner diameter of the cylindrical portion of the bottomed cylindrical member and an inner diameter of the end of the pressure introducing joint; the end of the cylindrical portion of the bottomed cylindrical member and the end of the pressure introducing joint are butt-welded with an outer circumference of the cylindrical filler metal contacting the inner circumferences of the cylindrical portion of the bottomed cylindrical member and the pressure introducing joint to integrate the bottomed cylindrical portion and the pressure introducing joint via a weld portion; and a weld depth of the weld portion is adjusted so that Ni content of the weld portion is in the range from 20 to 30 wt %.

In the present invention, since Ni content of the weld portion can be adjusted by bringing the cylindrical filler metal with an intercommunicating hole at the center thereof into contact with the portion to be welded and adjusting the weld depth in welding, the welding can be performed with a simple structure. Also, by adjusting Ni content of the weld portion to be in the range from 20 to 30 wt %, the weldability can be enhanced.

DETAILED DESCRIPTION OF PREFERRED EMBODIMENT(S)

[First Embodiment]

A first embodiment of the present invention will be described with reference to the attached drawings.

Figure 1:
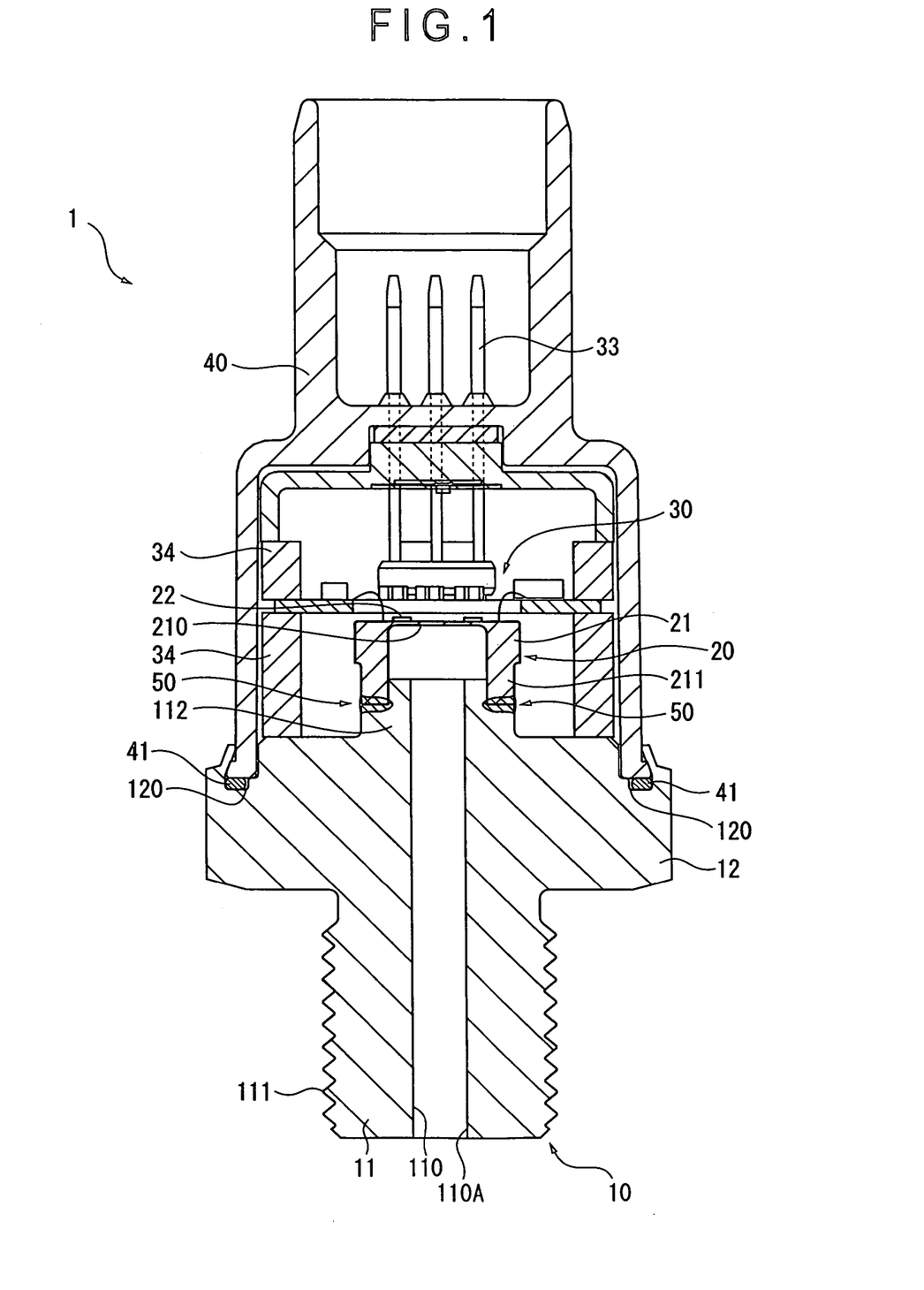
FIG. 1 is a front elevation showing a cross section of a pressure sensor according to a first embodiment of the present invention.

FIG. 1 shows a pressure sensor 1 of the first embodiment. The pressure sensor 1 can measure pressure of a gas, a liquid and other variety of fluids circulating in a pipe, especially, the pressure sensor 1 can measure a fluid pressure of an acid gas and a chemical solution having high corrosiveness and a hydrogen gas causing embrittlement. In FIG. 1, the pressure sensor 1 includes a pressure introducing joint 10, a pressure detector 20, a circuit 30 and a housing 40, where the pressure introducing joint 10 and the pressure detector 20 are jointed and integrated by an electron beam welding, and a weld portion 50 is formed on the jointed portion.

[Arrangement of Pressure Introducing Joint 10]

The pressure introducing joint 10 is connected to a pipe (not shown) in which a fluid to be measured circulates to feed the fluid circulating in the pipe to the pressure detector 20, in which a cylindrical portion 11 and a disc flange 12 are integrated. The pressure introducing joint 10 is made of an austenitic stainless steel which is less expensive and has lower mechanical strength and equal corrosion resistance as compared to an austenitic precipitation hardening Fe—Ni heat resisting steel The austenitic stainless steel includes, for instance, SUS304 and SUS316. The SUS304 is a general austenitic stainless steel containing 18–20 wt % of Cr and 8–10.5 wt % of Ni, while the SUS316 is an austenitic stainless steel containing 16–18 wt % of Cr, 10–14 wt % of Ni, 2–3 wt % of Mo (molybdenum) and 0.08 wt % or less of C (carbon). Although tensile strengths of these materials are approximately 520 MPa, which is low, the pressure introducing joint can be designed to be thick, so that these materials having excellent corrosion resistance will cause no disadvantages even with the low tensile strengths. It is apparent that any other austenitic stainless steels can be used for the pressure introducing joint 10 without limiting to the materials described above.

The cylindrical portion 11 is formed substantially cylindrically, and a cylindrical space inside thereof serves as a flow path 110 in which the fluid circulates. An outer circumference on a first end of the cylindrical portion 11 has a screw 111 screwed into the pipe (not shown), while an outer circumference on a second end of the cylindrical portion 11 has a joint portion 112 to be jointed with the pressure detector 20. One end of the flow path 110 on a side with the screw 111 being formed serves as a pressure introducing port 110A from which the fluid fed from the pipe (not shown) is introduced. The screw 111 is a spiral male thread groove, which is screwed into a female thread groove formed on an inner surface of the pipe (not shown). The joint portion 112 includes a circular joint surface 112A and a circular step 112B, which are formed by cutting the outer circumference on the second end of the cylindrical portion 11.

The disc flange 12 radially extends like a disc toward the outer side of the cylindrical portion substantially at a middle position of the screw 111 of the cylindrical portion 11 and the joint portion 112. A fitting portion 120 being a circular groove is formed on a peripheral portion of a surface on a side with the pressure detector 20 being provided in the disc flange 12, the fitting portion 120 being fitted by the housing 40. A profile of the disc flange 12 is circle with two opposing portions being cut off or a hexagon, where a spanner is applied when the screw 111 is screwed in to the pipe (not shown).

[Arrangement of Pressure Detector 20]

The pressure detector 20 is an element for detecting the pressure of the fluid circulating in the pipe (not shown) as an electric signal, which includes a diaphragm 21 strained by the fluid pressure and a strain gauge 22 converting the strain to the electric signal. The diaphragm 21 is a bottomed cylindrical member, in which a thin-wall portion 210 as a bottom and a cylindrical portion 211 are integrated. The diaphragm 21 uses an authentic precipitation hardening Fe—Ni heat resisting steel.

For instance, SUH660 steel can be exemplified as the austenitic precipitation hardening Fe—Ni heat resisting steel. The SUH660 steel is a material having high mechanical strength as well as excellent corrosion resistance, which contains 24–27 wt % of Ni, 13.5–16 wt % of Cr, 0.35 wt % or less of Al (aluminum) and 1.9–2.35 wt % of Ti (titanium). The SUH660 steel is produced by providing an aging treatment (the treatment for keeping the material at 700° C. or higher for 16 hours and then lowering the temperature to be equal to the ambient temperature) after solution treatment for precipitating an intermetallic compound Ni3 [Al, Ti] phase (γ' phase) in an austenite phase (γ phase) to improve the mechanical strength, the SUH660 having a tensile strength of 1060 MPa or higher.

The thin-wall portion 210 has a thin disc body, and when the fluid acts on the portion, an elastic deformation is generated in the thin-wall portion 210 by the fluid pressure. The greater the strain resulted from the elastic deformation is, the greater electric signal the strain gauge 22 generates, which allows detection of a pressure value with higher accuracy. A material used for the thin-wall portion 210 requires strength sufficiently withstandable even when the great strain is generated, specifically, the tensile strength requires to be 800 MPa or higher, more preferably, 1000 MPa or higher. Since the thin-wall portion 210 is made of the austenitic precipitation hardening Fe—Ni heat resisting steel having a tensile strength of 1060 MPa or higher, it can sufficiently withstand the fluid pressure even when the thickness of the disc is formed to be thinner, so that a great strain can be obtained.

The cylindrical portion 211 is a cylinder with a sidewall thereof formed to be thick, and the thin-wall portion 210 integrated so as to close the first end of the cylindrical portion 211. Entire circumferences of a second opening end of the cylindrical portion 211 and the joint surface 112A of the pressure introducing joint 10 are jointed by butt-welding. Inner and outer diameters of the second end of the cylindrical portion 211 corresponds to those of the circular joint surface 112A of the joint portion 112 of the pressure introducing joint 10

After forming an insulating layer 220 entirely on the outer surface of the thin-wall portion 210, the strain gauge 22 is provided to one or more positions, most preferably four positions, on the insulating layer, where the bridge circuit is formed to convert the strain of the thin-wall portion 210 to the electric signal to be output. The each strain gauge 22 is provided with an electrode 221 from which the electric signal is transmitted to the circuit 30. As the strain gauge 22, a conventional wire strain gauge technique can be employed. The insulating layer 220 is provided for insulating conductivity between the strain gauge 22 and the diaphragm 21, in which an adhesive containing glass, a polyimide adhesive or the like is used. In order to accurately detect the strain of the thin-wall portion, the thin-wall portion 210, the insulating layer 220 and the strain gauge 22 are required to be securely jointed with each other.

[Arrangement of Circuit 30]

Figure 2:
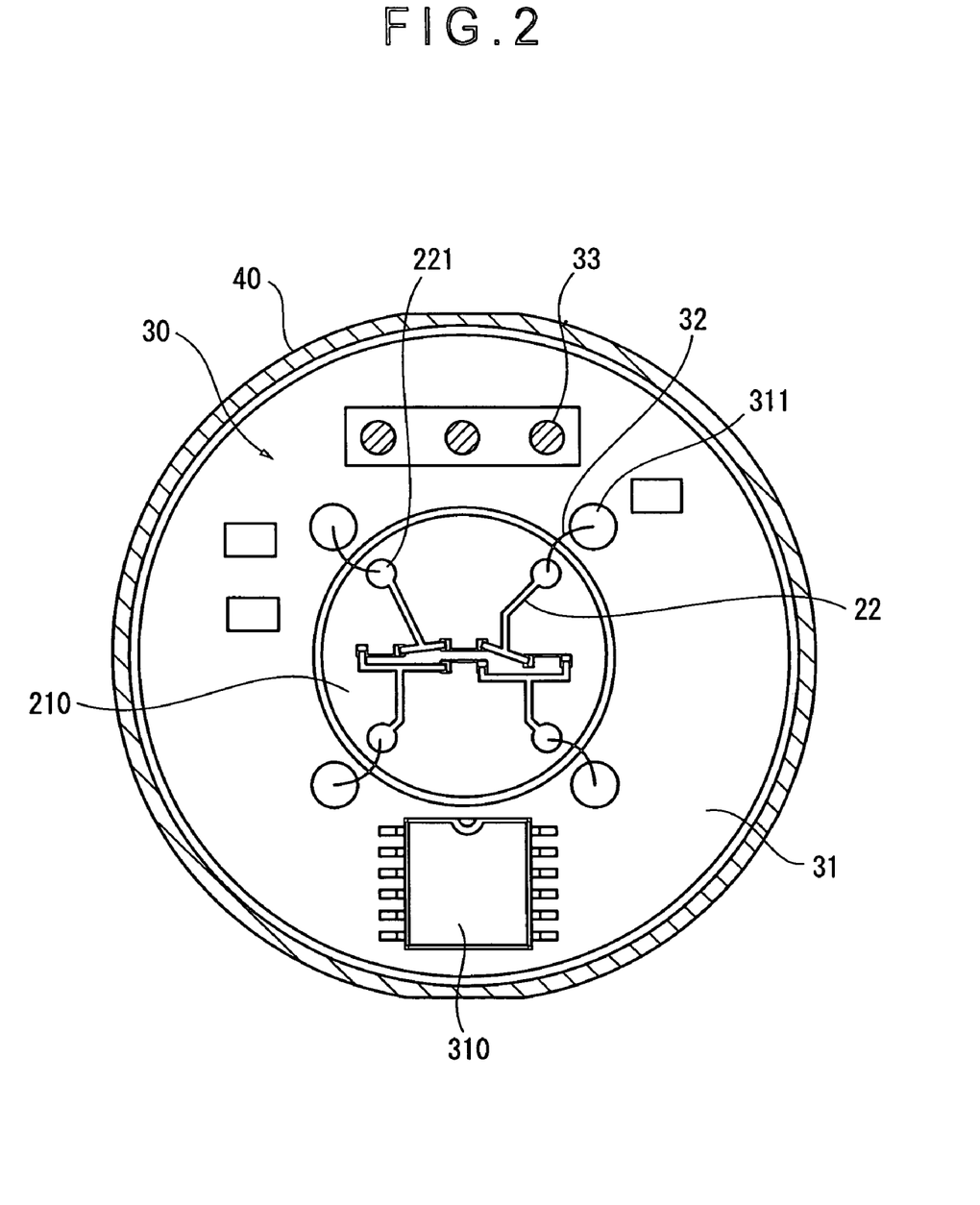
FIG. 2 is a plan view of a circuit according to the embodiment.

Next, the circuit 30 will be described in detail with reference to the drawing. FIG. 2 is a plan view showing the circuit 30 according to the present embodiment. As shown in FIG. 2, the circuit 30 includes an amplifier circuit board 31 formed like a circular plate, a wire bond 32 and an input/output terminal 33, the circuit 30 having a function for amplifying the electric signal generated in the strain gauge 22 and transmitting the amplified electric signal to the outside. A circuit component 310 and electrodes 311 are provided on the amplifier circuit board 31, the electrode 311 connected to the electrode 221 of the strain gauge 22 by the wire bond 32 inside the amplifier circuit board 31. The input/output terminals 33 are three terminals communicating an external terminal (not shown) and the circuit 30, the input/output terminal 33 outputting the electric signal of the strain gauge 22 amplified by the circuit component 310 to the external terminal, while supplying a power from the external terminal to the circuit 30. The spacer 34 is a cylindrical member for fixing the amplifier circuit board 31 to the pressure introducing joint 10, which is arranged so as to support an outer circumference of the amplifier circuit board 31.

[Arrangement of Housing 40]

In FIG. 1, the housing 40 is a protection casing having a substantially tubular shape for protecting the pressure detector 20 and the circuit 30 from moisture and dust intruded from the outside, an end of which has a gasket 41 engaged with the fitting portion 120 of the pressure introducing joint 10.

[Arrangement of Weld Portion 50]

Figure 3:
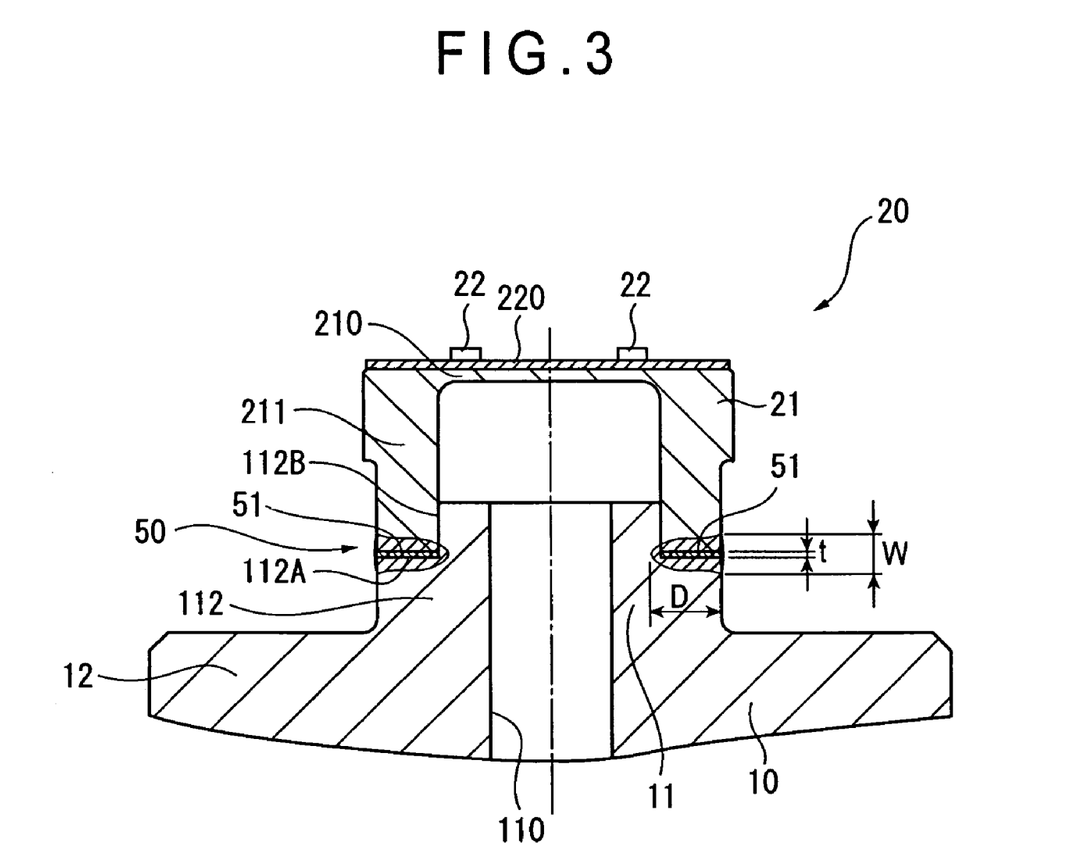
FIG. 3 is a front elevation showing a cross section of a weld portion according to the embodiment.

Next, a weld portion 50 will be described in detail with reference to the drawing. FIG. 3 is a front elevation showing a cross section of a weld portion 50 according to the present embodiment. The weld portion 50 is formed by butt-welding entire circumferences of the joint surface 112A of the pressure introducing joint 10 and an opening end of the cylindrical portion 211 of the diaphragm 21 by an electron beam welding method, and a disc-shaped filler metal 51 with a hole at the center thereof is interposed between the joint surface 112A and the opening end of the cylindrical portion. The disc-shaped filler metal 51 is interposed for adjusting a composition of the weld portion 50, and an alloy with high Ni content as well as 100% Ni (pure Ni) can be used as a material. Inner and outer diameters of the disc-shaped filler metal 51 substantially corresponds to those of the circular joint surface 112A of the joint portion 112 and the cylindrical portion 211, respectively.

Now, welding performed on the pressure introducing joint 10 and the diaphragm 21 will be described. In FIG. 3, first, the disc-shaped filler metal 51 is interposed between the joint surface 112A of the pressure introducing joint 10 and the opening end of the cylindrical portion 211 of the diaphragm. In this state, one side of the disc-shaped filler metal 51 opposes the circular joint surface 112A of the pressure introducing joint 10, while the other side thereof opposes the second end of the cylindrical portion 211 of the diaphragm 21, and further, the circular step 112B of the pressure introducing joint 10 and an inner circumference of the cylindrical portion 211 of the diaphragm 21 entirely contact to each other.

Next, these members are placed in a vacuum chamber of an electron beam welder (not shown), and after vacuating the chamber, an electron beam is irradiated from the outer circumference of the portion to be welded toward the inner circumference thereof.

After the electron beam is irradiated, a part of each of the disc-shaped filler metal 51, the joint portion 112 of the pressure introducing joint 10 and the opening end of the cylindrical portion 211 of the diaphragm 21 melts, and material components of the respective members are dispersed and mixed to each other at the melted parts. Specifically, the material components of the diaphragm 21 are dispersed toward the pressure introducing joint 10 via the disc-shaped filler metal 51, whereas the material components of the pressure introducing joint 10 are dispersed toward the diaphragm 21 via the disc-shaped filler metal 51. At the same time, the material components of the disc-shaped filler metal 51 are also dispersed toward the pressure introducing joint 10 and the diaphragm 21. Since the electron beam having high energy density is irradiated during the electron beam welding, a deep welding can be performed in which an aspect ratio of a weld width W and a weld depth D is two or higher as shown in FIG. 3, so that the disc-shaped filler metal 51 irradiated by the electron beam melts from the outer circumference to the inner circumference.

The pressure introducing joint 10, the diaphragm 21 and the disc-shaped filler metal 51 are assembled and rotated in the vacuum chamber, and the electron beam is irradiated over the entire circumferences of the respective portions to be welded. When the welding is completed, the weld portion 50 is formed, where the pressure introducing joint 10 and the diaphragm 21 are jointed integrally via the disc-shaped filler metal 51. Here, in order to prevent the fluid as an object to be measured from leaking from the weld portion 50, the welding has to be performed completely and generation of cracks in a weld structure should be avoided.

In the present embodiment, by adjusting the thickness t of the disc-shaped filler metal 51, Ni content of the weld portion 50 is adjusted to be higher than an average of Ni content of the pressure introducing joint 10 and that of the diaphragm 21, specifically in the range from 20 to 30 wt %. The weldability of the weld portion 50 is enhanced with the arrangement described above, which becomes apparent in a later-described experiment. Incidentally, although a slight hot crack occurs in the weld portion 50 when Ni content of the weld portion 50 is over 30 wt %, there is no practical disadvantage.

[Advantage of First Embodiment]

With the pressure sensor 1 of the pressure sensor 1 of the first embodiment of the present invention, the following advantages can be obtained.

(1) Since the austenitic precipitation hardening Fe—Ni heat resisting steel having high mechanical strength is used for the diaphragm 21 with the thin-wall portion 210 on the bottom, the thin-wall portion 210 can be produced to be thin, so that a high strain can be generated at the thin-wall portion 210. Thus, the pressure sensor 1 can be provided with high accuracy and reliability.

(2) The diaphragm 21 and the pressure introducing joint 10 are independently provided, and the austenitic precipitation hardening Fe—Ni heat resisting steel is used for the diaphragm 21 while the austenitic stainless steel, which is relatively inexpensive, is used for the pressure introducing joint 10. By integrating the diaphragm 21 and the pressure introducing joint 10 by welding or the like, usage amount of the expensive austenitic precipitation hardening Fe—Ni heat resisting steel can be minimized in manufacturing. As a result, the pressure sensor 1 which is relatively inexpensive can be provided.

(3) The austenitic precipitation hardening Fe—Ni heat resisting steel having excellent corrosion resistance is used for the diaphragm 21, and the austenitic stainless steel also having excellent corrosion resistance is used for the pressure introducing joint, so that portions exposed to the fluid to be measured can be provided with high corrosion resistance. Thus, the pressured sensor capable of measuring an acid gas, a corrosive chemical solution and a hydrogen gas causing embrittlement that have been difficult to measure can be provided.

(4) Since the welding of the second end of the cylindrical portion 211 of the diaphragm 21 and the joint portion 112 of the pressure introducing joint 10 are performed by the electron beam welding, the welding can be completed in a short period of time, the composition of the weld portion 50 can be easily adjusted, and further, deep welding in which the aspect ratio of the weld width W and the weld depth D is two or higher can be realized. Consequently, the diaphragm 21, the pressure introducing joint 10 and the strain gauge 22 are not thermally affected respectively, and the above members can be welded completely from the outer circumferences to the inner circumferences.

(5) The disc-shaped filler metal 51 is interposed between the second end of the cylindrical portion 211 of the diaphragm 21 and the joint surface 112A of the pressure introducing joint 10, and Ni content of the weld portion 50, which is formed by welding the portions to be welded, is adjusted to be higher than the average of Ni content of the pressure introducing joint 10 and that of diaphragm 21, specifically in the range from 20 to 30 wt %, so that the weldability can be enhanced. Accordingly, even with the austenitic stainless steel and the austenitic precipitation hardening Fe—Ni heat resisting steel each generally having poor weldability and likely generating hot crack, the diaphragm 21 and the pressure introducing joint 10 can be welded with the structure of the weld portion 50 being kept to be austenite.

(6) The inner and outer diameters of the disc-shaped filler metal 51 with a hole at the center thereof substantially corresponds respectively to those of the cylindrical portion 211 of the diaphragm 21 and those of the circular joint surface 112A of the pressure introducing joint 10. By interposing the disc-shaped filler metal 51 between the second end of the cylindrical portion 211 of the diaphragm 21 and the joint surface 112A of the pressure introducing joint 10 and performing welding, the diaphragm 21 and the pressure introducing joint 10 can be integrated via the weld portion 50, and further, by adjusting the thickness t of the disc of the filler metal 51, Ni content of the weld portion 50 can be appropriately adjusted. Therefore, the welding can be performed securely with a simple arrangement.

[Experiment]

Next, an experiment for verifying the advantages of the present invention will be described.

Figure 4:
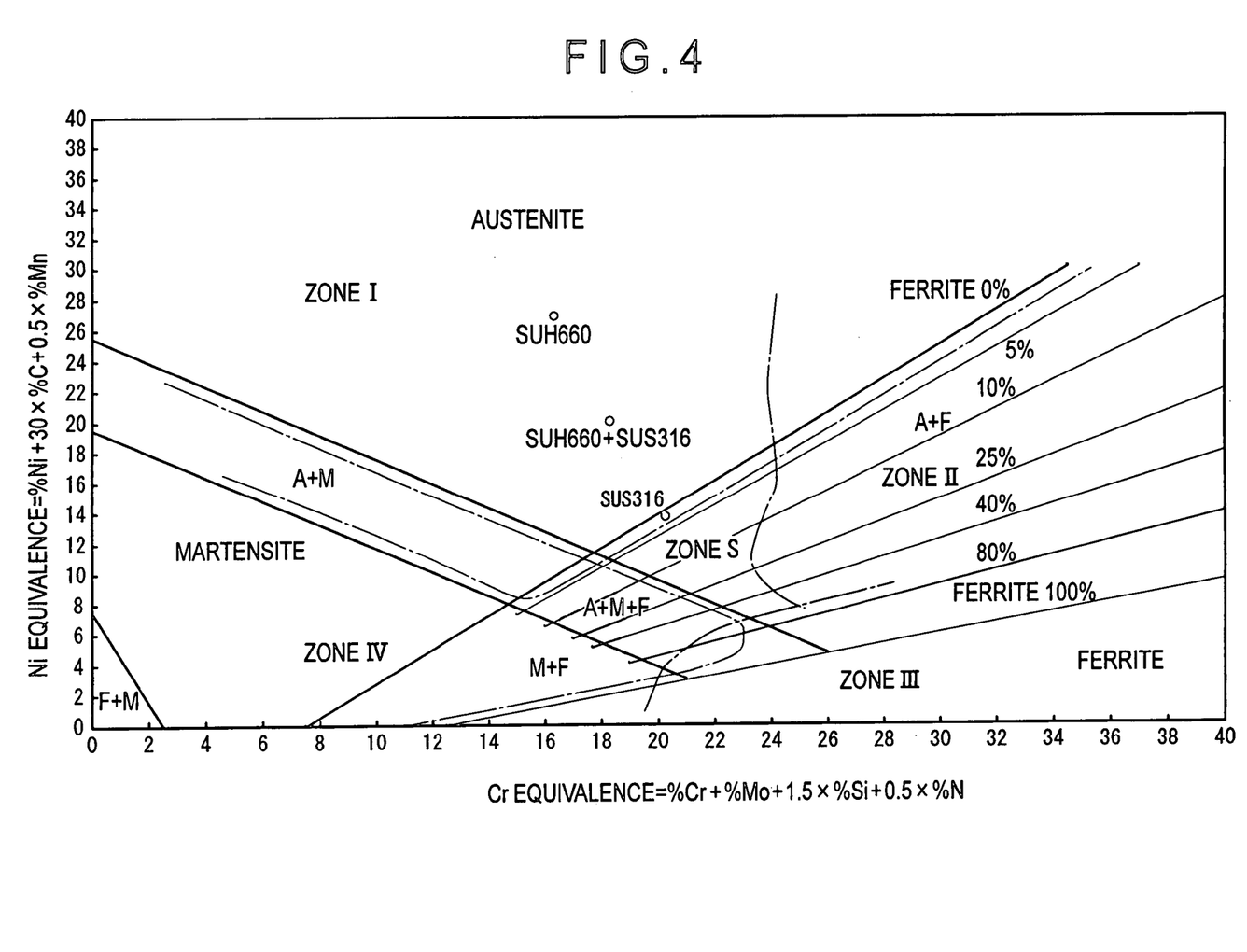
FIG. 4 is Schaeffler diagram showing problems related to a welding of stainless steels.

First, composition of the weld portion 50 of the present embodiment will be described in detail with reference to the attached drawings. FIG. 4 is Schaeffler diagram incorporating disadvantages related to welding of stainless steel (Japan Welding engineering Society: "Welding technology," Vol. 45, No. 4, Apr. 1, 1997, page 136, FIG. 50). The Schaeffler diagram is widely referred for safely welding in welding stainless steel. When the composition of the weld portion belongs to each zone zoned by dashed lines in FIG. 4, the following problems are observed in the weld portion. Zone I: when the temperature of the weld portion is 1250° C. or higher, a hot crack occurs. Zone II: a sigma precipitation embrittlement occurs in the structure of the weld portion due to thermal treatment. Zone III: when the temperature of the weld portion is 1150° C. or higher, a coarse-grain embrittlement occurs in the structure of the weld portion, while when the temperature of the weld portion is at the ambient temperature, a notch embrittlement occurs. Zone IV: when the temperature of the weld portion is 400° C. or higher, a martensite crack occurs.

Incidentally, in FIG. 4, Zone S that does not belong to any of Zones I to IV is a safety zone where any disadvantage occurs in the structure of the weld portion.

A case where the SUS316 as an austenitic stainless steel is used for the pressure introducing joint 10 and the SUH660 as an austenitic precipitation hardening Fe—Ni heat resisting steel is used for the diaphragm 21 will be described below. Since Ni content of the SUH660 is 24–27 wt % and Ni content of the SUS316 is 10–14 wt %, when the SUH660 and the SUS316 are butt-welded directly without interposing the filler metal, Ni content of the weld portion is generally 20 wt % or less.

In FIG. 4, a point indicating a composition of the SUH660, a point indicating a composition of the SUS316 and a point indicating an intermediate composition of them (SUH660+SUS316) are plotted. The point of the SUH660 is located at a position having a perfect austenite structure, while the point of the SUS316 is located at a position having an austenite structure with a few % of ferrite contained. The composition of the weld portion is located at the position indicated by the point of SUH660+SUS316, which is in a zone of the perfect austenite structure.

Generally, in welding a stainless steel, when the structure of the weld portion is located in the Zone S as a safety zone in FIG. 4, disadvantages caused by welding do not occur. However, the structure of the weld portion of the present embodiment is in the zone of the austenite structure (Zone I) which is off the safety zone, and thus the hot crack generating cracks in the weld portion likely occurs.

However, in the present embodiment, it becomes clear in an experiment that, by interposing the filler metal having high Ni content and adjusting Ni content of the weld portion 50 to be higher than an average of Ni content of the pressure introducing joint 10 and that of the diaphragm 21, specifically in the range from 20 to 30 wt %, the hot crack does not occur even when the structure of the weld portion is kept to be an austenite structure. FIGS. 5 through 9 are photographs of external views respectively showing the weld portion 50 under the conditions where Ni content is set to be in the range of 18–65% by adjusting thickness t of the disc-shaped filler metal 51.

Figure 5:
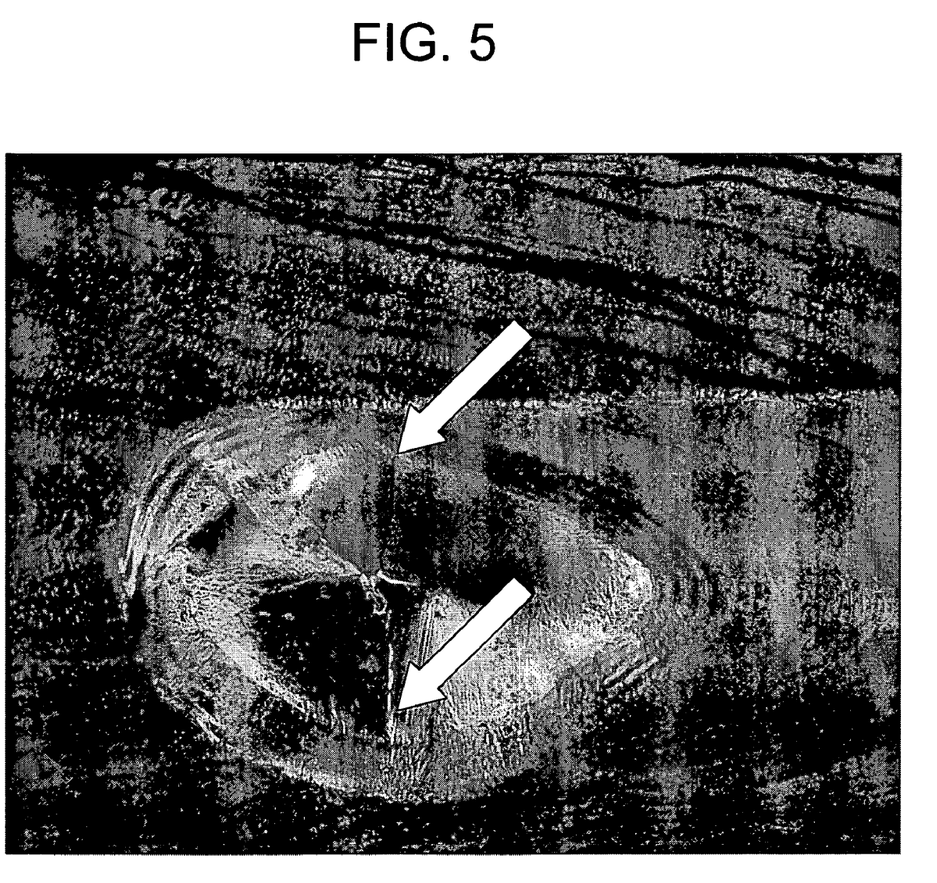
FIG. 5 is a photograph showing an exterior view of a bead in the weld portion in which Ni content is 18% in the weld portion according to the first embodiment of the present invention.

FIG. 5 is a photograph showing an exterior view of a bead in the weld portion 50 with Ni content of the weld portion 50 being 18 wt %. Large cracks caused by the hot crack can be observed on the parts shown with arrows in the photograph.

Figure 6:
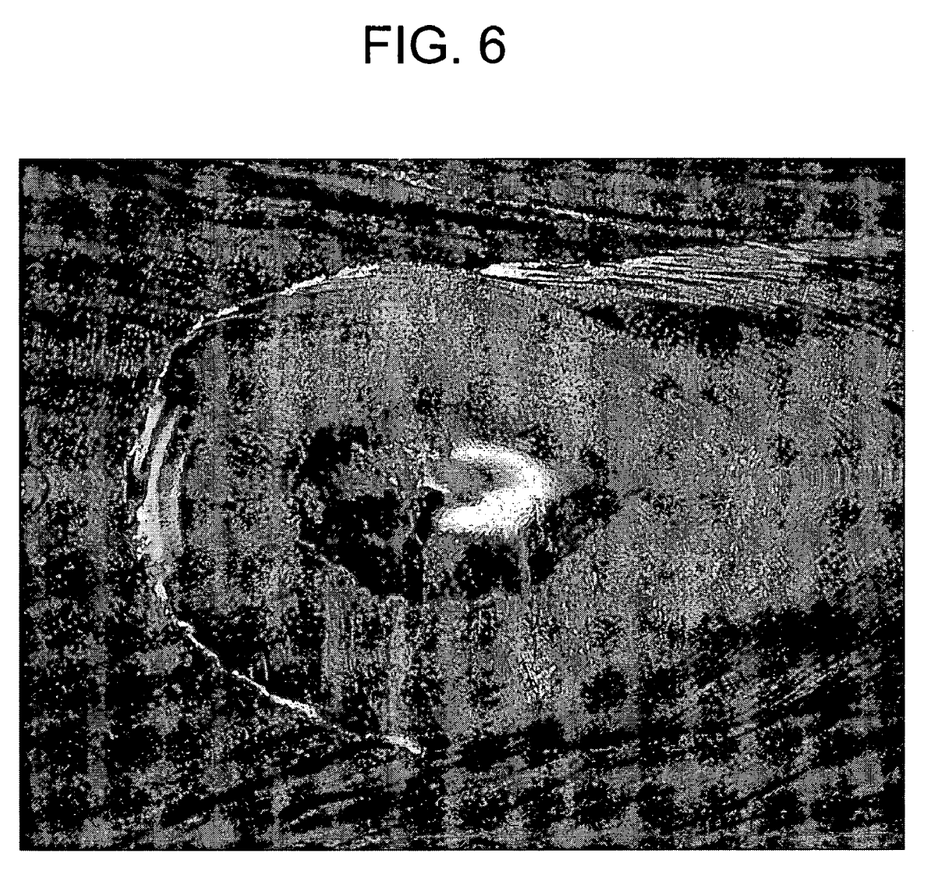
FIG. 6 is a photograph showing an exterior view of a bead in the weld portion in which Ni content is 25% in the weld portion according to the embodiment.

FIG. 6 is a photograph showing an exterior view of a bead in the weld portion 50 with Ni content of the weld portion 50 being around 25 wt %. In FIG. 6, cracks caused by the hot crack are not observed in the weld portion 50, which shows that the welding is performed properly. In a photograph (not shown) of an external view of a bead in the weld portion 50 when Ni content of the weld portion 50 is 20 wt %, and another photograph (not shown) of an external view of a bead in the weld portion 50 when Ni content of the weld portion 50 is 30 wt %, cracks caused by the hot crack are not observed as in FIG. 6.

Figure 7:
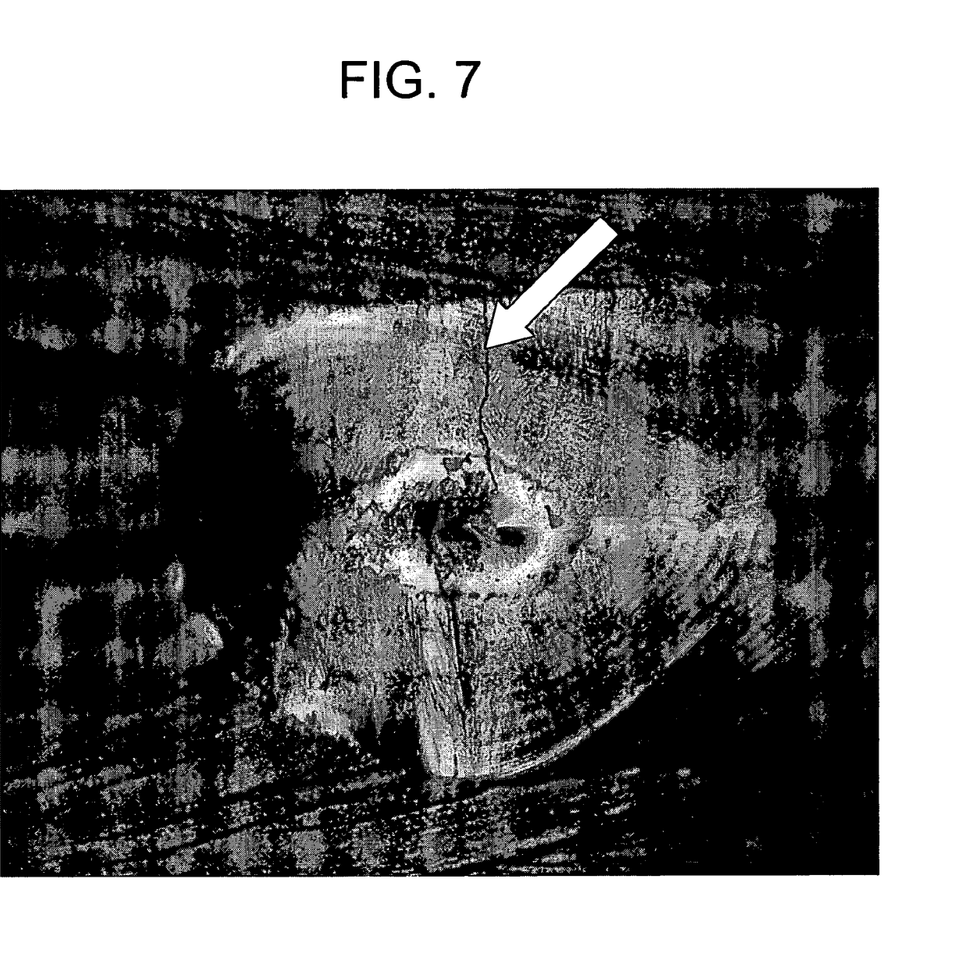
FIG. 7 is a photograph showing an exterior view of a bead in the weld portion in which Ni content is 40% in the weld portion according to the embodiment.
Figure 8:
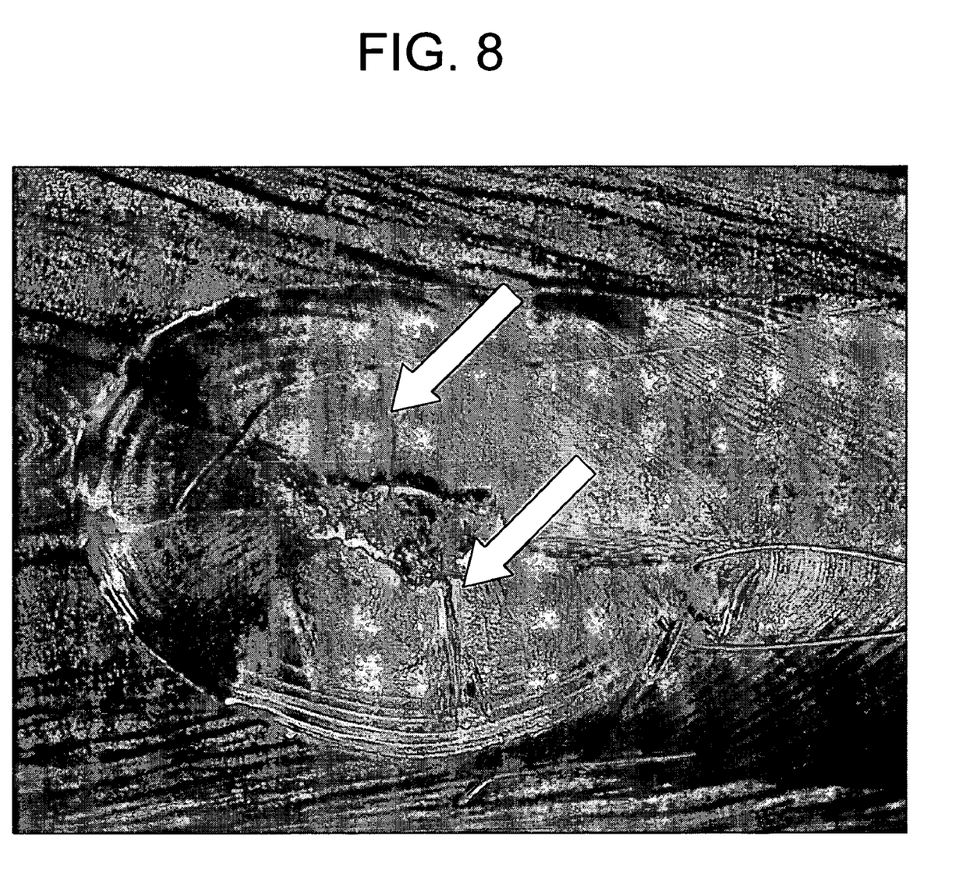
FIG. 8 is a photograph showing an exterior view of a bead in the weld portion in which Ni content is 56% in the weld portion according to the embodiment.
Figure 9:
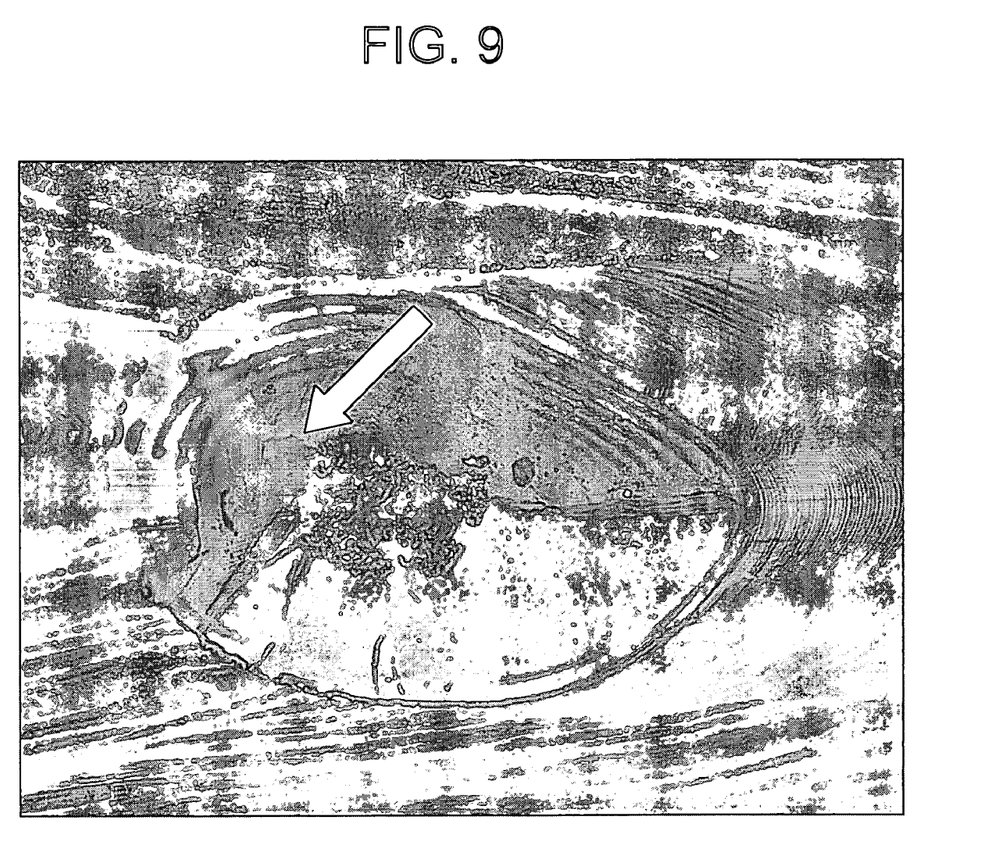
FIG. 9 is a photograph showing an exterior view of a bead in the weld portion in which Ni content is 65% in the weld portion according to the embodiment.

FIG. 7 is a photograph of an external view of a bead in the weld portion 50 when Ni content of the weld portion 50 is 40 wt %, FIG. 8 is a photograph of an external view of a bead in the weld portion 50 when Ni content of the weld portion 50 is 56 wt %, and FIG. 9 is a photograph of an external view of a bead in the weld portion 50 when Ni content of the weld portion 50 is 65 wt %. In the weld portions 50 shown in any of FIGS. 7 through 9, although small cracks caused by the hot crack are observed at positions shown with arrows, there is no practical disadvantage. With the photographs of the external views, it can be appreciated that, when the Ni content of the weld portion 50 is 20 wt % or higher, the strength can be sufficiently obtained even though slight cracks are observed in the weld portions, and especially when the Ni content is in the range from 20 to 30 wt %, the cracks are not observed and the proper welding can be realized.

[Second Embodiment]

Figure 10:
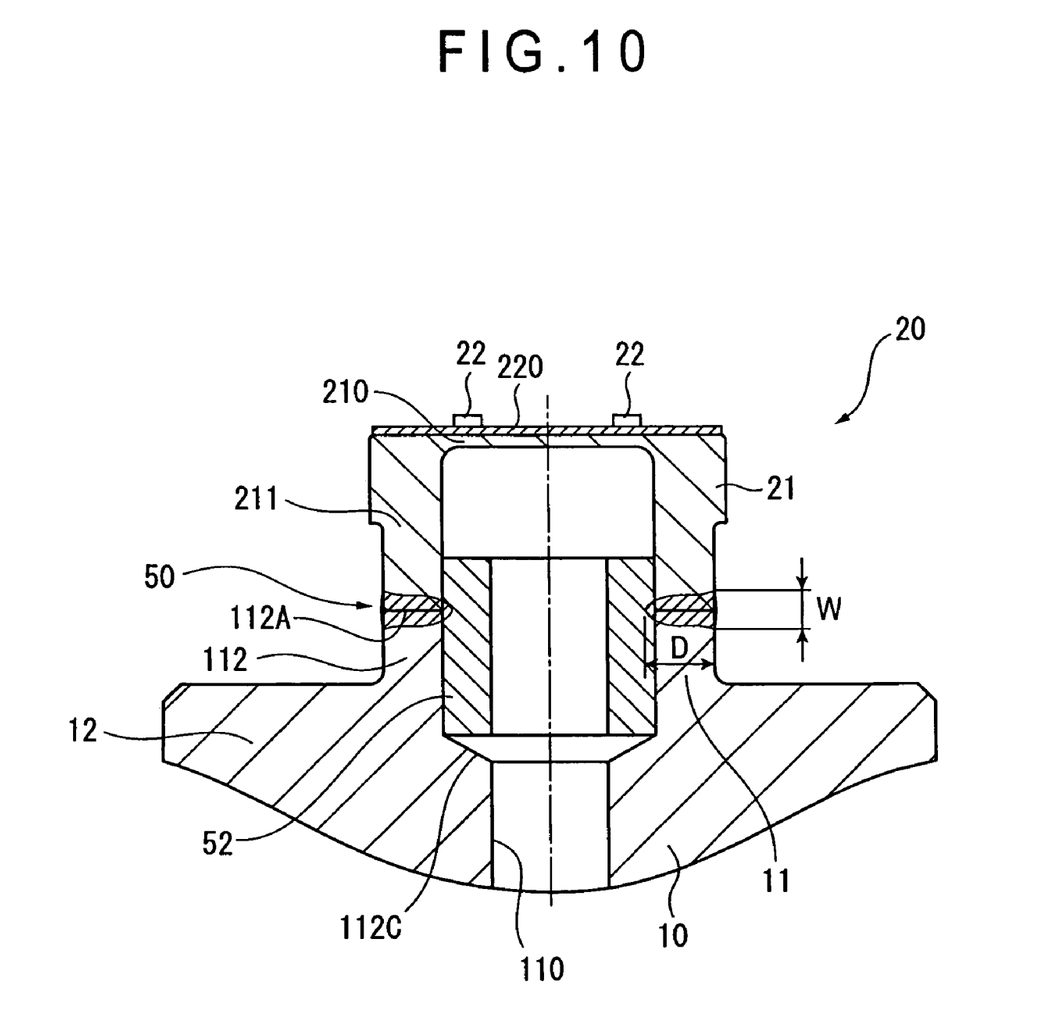
FIG. 10 is a front elevation showing a weld portion of a pressure sensor according to a second embodiment of the present invention.

Next, a second embodiment of the present invention will be described with reference to the attached drawing. FIG. 10 is a front elevation showing a cross section of a weld portion 50 of a pressure sensor 1 according to the second embodiment. Incidentally, since the pressure sensor 1 of the second embodiment has an arrangement substantially the same as the pressure sensor 1 of the first embodiment described above, the description will be given only for points different from the pressure sensor 1 of the first embodiment.

In FIG. 10, the joint portion 112 of the pressure introducing joint 10 is cylindrical, an end surface of which is provided with the circular joint surface 112A. The inner circumference of the joint portion 112 is formed to be slightly wider than the flow path 110, and a taper 112C is provided at a predetermined position on the inner circumference of the joint portion 112. The diaphragm 21 is so formed that an inner diameter of the cylindrical portion 211 is substantially equal to that of the joint portion 112 of the pressure introducing joint 10.

In welding the pressure introducing joint 10 and the diaphragm 21, a cylindrical filler metal 52 is provided to a portion to be welded. The cylindrical filler metal 52 is interposed for adjusting a composition of the weld portion 50, and an alloy with high Ni content as well as 100% Ni (pure Ni) can be used as a material thereof. The cylindrical filler metal 52 has an intercommunicating hole at the center thereof, an outer diameter of which is formed to be substantially equal to inner diameters of the cylindrical portion 211 of the diaphragm 21 and the joint portion 112 of the pressure introducing joint 10. When the cylindrical filler metal 52 is inserted inside the joint portion 112 of the pressure introducing joint 10, a first end of the cylindrical filler metal 52 is engaged with the taper 112C of the joint portion 112, while a second end there of protrudes from the circular joint surface 112A.

[Arrangement of Weld Portion 50]

The weld portion 50 is formed by butt-welding entire circumferences of the joint surface 112A of the pressure introducing joint 10 and the opening end of the cylindrical portion 211 of diaphragm by an electron beam welding method, and a cylindrical filler metal 52 is interposed respectively on the inner circumferences of the joint portion 112 of the pressure introducing joint 10 and the cylindrical portion 211 of the diaphragm 21. The weld portion 50 is formed as follows.

First, by inserting the cylindrical filler metal 52 inside the joint portion 112 of the pressure introducing joint 10, the outer circumference of the cylindrical filler metal 52 and the inner circumference of the joint portion 112 contact to each other, and further, the first end of the cylindrical filler metal 52 is engaged with the taper 112C of the joint portion 112. The opening end of the cylindrical portion 211 of the diaphragm 21 is inserted into the second end of the cylindrical filler metal 52. The cylindrical filler metal 52 is housed inside the cylindrical portion 211 of the diaphragm 21 and inside the joint portion 112 of the pressure introducing joint 10, while the outer circumference of the cylindrical filler metal 52 respectively contact with the inner circumference of the cylindrical portion 211 of the diaphragm 21 and the inner circumference of the joint portion 112 of the pressure introducing joint 10.

Next, these members are placed in a vacuum chamber of an electron beam welder (not shown), and after vacuating the chamber, an electron beam is irradiated from the outer circumference of the portion to be welded toward the inner circumference thereof. The electron beam reaches inner sides of the cylindrical filler metal 52 from the outer circumference of the diaphragm 21 and the pressure introducing joint 10, and thereby, the circular joint surface 112A of the pressure introducing joint 10, the second end of the cylindrical portion 211 of the diaphragm 21 and one portion of the cylindrical filler metal 52 melt, so that material components of the respective members are dispersed and mixed to each other at the melted portions. In other words, the material components of the diaphragm 21 are dispersed toward the pressure introducing joint 10 and the cylindrical filler metal 52, the material components of the pressure introducing joint 10 are dispersed toward the diaphragm 21 and the cylindrical filler metal 52, and the material components of the cylindrical filler metal 52 is dispersed toward the pressure introducing joint 10 and the diaphragm 21.

The pressure introducing joint 10, the diaphragm 21 and the cylindrical filler metal 52 assembled to each other and rotated in the vacuum chamber, and the electron beam is irradiated over the entire circumferences of the respective portions to be welded. When the welding is completed, the weld portion 50 is formed, where the pressure introducing joint 10 and the diaphragm 21 are jointed integrally via the cylindrical filler metal 52. Here, in order to prevent the fluid as an object to be measured from leaking from the weld portion 50, the welding has to be performed completely and generation of cracks in a weld structure should be avoided.

In the present embodiment, by adjusting an intensity of the electron beam, the weld depth D is controlled and a melting amount of the cylindrical filler metal 52 is adjusted by the weld depth D, so that Ni content of the weld portion 50 is set to be higher than the average of Ni content of the pressure introducing joint 10 and that of the diaphragm 21, specifically in the range from 20 to 30 wt %. Thereby, the weldability of the weld portion 50 can be enhanced. Incidentally, when Ni content of the weld portion 50 is over 30 wt %, although a slight hot crack occurs in the weld portion 50, there is no practical disadvantage.

[Advantage of Second Embodiment]

With the pressure sensor 1 of the second embodiment of the present invention, the following advantages can be obtained in addition to the advantages (1) through (4) described above.

(7) By butt-welding the opening end of the cylindrical portion 211 of the diaphragm 21 and the joint portion 112 of the pressure introducing joint 10 with the cylindrical filler metal 52 interposed at the portions to be welded, Ni content of the weld portion 50 is set to be higher than the average of Ni content of the pressure introducing joint 10 and that of the diaphragm 21, specifically in the range from 20 to 30 wt %, so that the weldability can be enhanced. Accordingly, even with the austenitic stainless steel and the austenitic precipitation hardening Fe—Ni heat resisting steel each generally having poor weldability and likely generating hot crack, the diaphragm 21 and the pressure introducing joint 10 can be welded with the structure of the weld portion 50 being kept to be austenite.

(8) In the present embodiment, since the weld depth D can be controlled by adjusting the intensity of the electron beam, the melting amount of the filler metal 52 can be adjusted by changing the weld depth D, and thereby Ni content of the weld portion 50 can be appropriately adjusted. Therefore, the welding can be performed securely with a simple arrangement.

MODIFICATION

Incidentally, the present invention is not limited to the embodiments described above, but includes modifications and improvements as long as an object of the present invention can be achieved.

For instance, in the above embodiments, the disc-shaped filler metal 51 and the cylindrical filler metal 52 are used for adding Ni, but the filler metal in the present invention may be formed in other shapes such as wire-shaped.

In the above embodiments, the SUH660 is used as an austenitic precipitation hardening Fe—Ni heat resisting steel, the mechanical strength of which has further enhanced by solution treatment and aging treatment (the treatment for keeping the material at 700° C. or higher for 16 hours and then gradually lowering the temperature to be equal to the ambient temperature), but a method and a condition of the thermal treatment is not limited thereto: the temperature and the keeping time of the aging treatment are arbitrary as long as the treatment condition can provide a mechanical strength of 800 MPa or higher to the material; or the aging treatment may be performed repeatedly with the above-described aging treatment being a first aging treatment to further enhance the mechanical strength of the material, where the repeating number and condition after the first aging treatment are arbitrary.

In the above embodiments, although an arrangement is employed where the austenitic precipitation hardening Fe—Ni heat resisting steel is used only for the diaphragm 21 and the inexpensive austenitic stainless steel is used for the pressure introducing joint 10, the arrangement is for manufacturing the pressure sensor 1 with relatively low cost, which does not mean that the austenitic precipitation hardening Fe—Ni heat resisting steel cannot be used for the pressure introducing joint 10. Therefore, it is apparent that the advantages of the above embodiments can also be obtained with the pressure sensor 1 that uses the austenitic hardening precipitation Fe—Ni heat resisting steel for both the diaphragm 21 and the pressure introducing joint 10, and further, such pressure sensor can be provided with further higher strength, though expensive.

In the above embodiments, the diaphragm 21 and the pressure introducing joint 10 are respectively made of a single material, but the arrangement is not limited thereto. For instance, a laminate structure where another material is coated on a surface of each member may also be employed.

The priority applications Numbers JP2004-216549 upon which this patent application is based is hereby incorporated by reference.

What is claimed is:

1. A pressure sensor for measuring pressure of a fluid to be measured, comprising:
   a pressure detector having a bottomed cylindrical member with a bottom formed in a thin-wall portion and a strain gauge formed on the bottom for detecting a strain of the bottom; and
   a pressure introducing joint for introducing a fluid to be measured inside the bottomed cylindrical member, wherein
   the bottomed cylindrical member is made of an austenitic precipitation hardening Fe—Ni heat resisting steel containing 24 to 27 wt % of Ni and 13.5 to 16 wt % of Cr,
   the pressure introducing joint is made of an austenitic stainless steel, an end of a cylindrical portion of the bottomed cylindrical member and an end of the pressure introducing joint are butt-welded to integrate the bottomed cylindrical portion and the pressure introducing joint via a weld portion, and
   Ni content of the weld portion is adjusted to be higher than an average of Ni content of the bottomed cylindrical member and Ni content of the pressure introducing joint.

2. The pressure sensor according to claim 1, wherein
the end of the cylindrical portion of the bottomed cylindrical member and the end of the pressure introducing joint are butt-welded with a filler metal interposed at a portion to be welded to adjust Ni content of the weld portion to be in the range from 20 to 30 wt %.

3. The pressure sensor according to claim 2, wherein
the end of the cylindrical portion of the bottomed cylindrical member and the end of the pressure introducing joint are welded by an electron beam.

4. The pressure sensor according to claim 2, wherein
the filler metal is a disc with a hole formed at the center thereof, outer and inner diameters thereof being substantially equal to those of the cylindrical portion of the bottomed cylindrical member,
the end of the cylindrical portion of the bottomed cylindrical member and the end of the pressure introducing joint are welded with the disc-shaped filler metal interposed therebetween to integrate the bottomed cylindrical portion and the pressure introducing joint via the weld portion, and
Ni content of the weld portion is adjusted by a thickness of the disc of the filler metal to be in the range from 20 to 30 wt %.

5. The pressure sensor according to claim 3, wherein
the filler metal is a disc with a hole formed at the center thereof, outer and inner diameters thereof being substantially equal to those of the cylindrical portion of the bottomed cylindrical member,
the end of the cylindrical portion of the bottomed cylindrical member and the end of the pressure introducing joint are welded with the disc-shaped filler metal interposed therebetween to integrate the bottomed cylindrical portion and the pressure introducing joint via the weld portion, and
Ni content of the weld portion is adjusted by a thickness of the disc of the filler metal to be in the range from 20 to 30 wt %.

6. The pressure sensor according to claim 2, wherein
the inner diameter of the cylindrical portion of the bottomed cylindrical member is substantially equal to that of the end of the pressure introducing joint
the filler metal is cylindrical with an intercommunicating hole formed at the center thereof, an outer diameter thereof being substantially equal to the inner diameter of the cylindrical portion of the bottomed cylindrical member and an inner diameter of the end of the pressure introducing joint,
the end of the cylindrical portion of the bottomed cylindrical member and the end of the pressure introducing joint are butt-welded with an outer circumference of the cylindrical filler metal contacting the inner circumferences of the cylindrical portion of the bottomed cylindrical member and the pressure introducing joint to integrate the bottomed cylindrical portion and the pressure introducing joint via a weld portion, and
a weld depth of the weld portion is adjusted so that Ni content of the weld portion is in the range from 20 to 30 wt %.

7. The pressure sensor according to claim 3, wherein
the inner diameter of the cylindrical portion of the bottomed cylindrical member is substantially equal to that of the end of the pressure introducing joint
the filler metal is cylindrical with an intercommunicating hole formed at the center thereof, an outer diameter thereof being substantially equal to the inner diameter of the cylindrical portion of the bottomed cylindrical member and an inner diameter of the end of the pressure introducing joint, the end of the cylindrical portion of the bottomed cylindrical member and the end of the pressure introducing joint are butt-welded with an outer circumference of the cylindrical filler metal contacting the inner circumferences of the cylindrical portion of the bottomed cylindrical member and the pressure introducing joint to integrate the bottomed cylindrical portion and the pressure introducing joint via a weld portion, and a weld depth of the weld portion is adjusted so that Ni content of the weld portion is in the range from 20 to 30 wt %.

* * * * *